United States Patent [19]

Fogelberg et al.

[11] 3,981,146
[45] Sept. 21, 1976

[54] VARIABLE RATIO MASTER CYLINDER

[75] Inventors: Mark J. Fogelberg, Elk Grove Village, Ill.; Frank E. Hill, Warren, Mich.

[73] Assignee: Borg-Warner Corporation, Chicago, Ill.

[22] Filed: Sept. 13, 1972

[21] Appl. No.: 288,817

[52] U.S. Cl. ................................. 60/574; 60/562; 188/347
[51] Int. Cl.² .......................................... B60T 11/12
[58] Field of Search ....... 60/54.5 A, 54.6 A, 54.6 E, 60/574; 188/347

[56] References Cited
UNITED STATES PATENTS

| 2,031,360 | 2/1936 | Boughton | 60/54.6 A |
| 2,180,454 | 11/1939 | Bowen | 60/54.6 A |
| 2,448,194 | 8/1948 | Schnell | 60/54.6 A |
| 3,165,896 | 1/1965 | Baldwin | 60/54.6 E |
| 3,391,646 | 7/1968 | Schlosser | 92/240 |
| 3,633,367 | 1/1972 | Baldwin | 60/54.6 E |

FOREIGN PATENTS OR APPLICATIONS

| 946,325 | 1/1964 | United Kingdom | 60/54.6 A |
| 671,959 | 5/1952 | United Kingdom | 60/54.6 A |

*Primary Examiner*—Martin P. Schwadron
*Attorney, Agent, or Firm*—James A. Geppert

[57] ABSTRACT

A variable ratio master cylinder designed to operate, in one phase, to take up slack in a braking system by displacing a relatively large volume of fluid at a low pressure with minimum pedal travel and then gradually shift to another phase in which a smaller volume of fluid is displaced at a higher pressure with increased pedal travel to apply the brakes. The master cylinder includes a differential area metering valve which begins to open at a predetermined pressure in the pressure chamber and remains open above a predetermined second pressure and sealing means cooperative with at least one piston to seal off communication between the pressure chamber and the rear of the piston during the pressure stroke of the piston but to allow communication between said chambers on the return stroke of the piston for rapid return to the released state.

15 Claims, 5 Drawing Figures

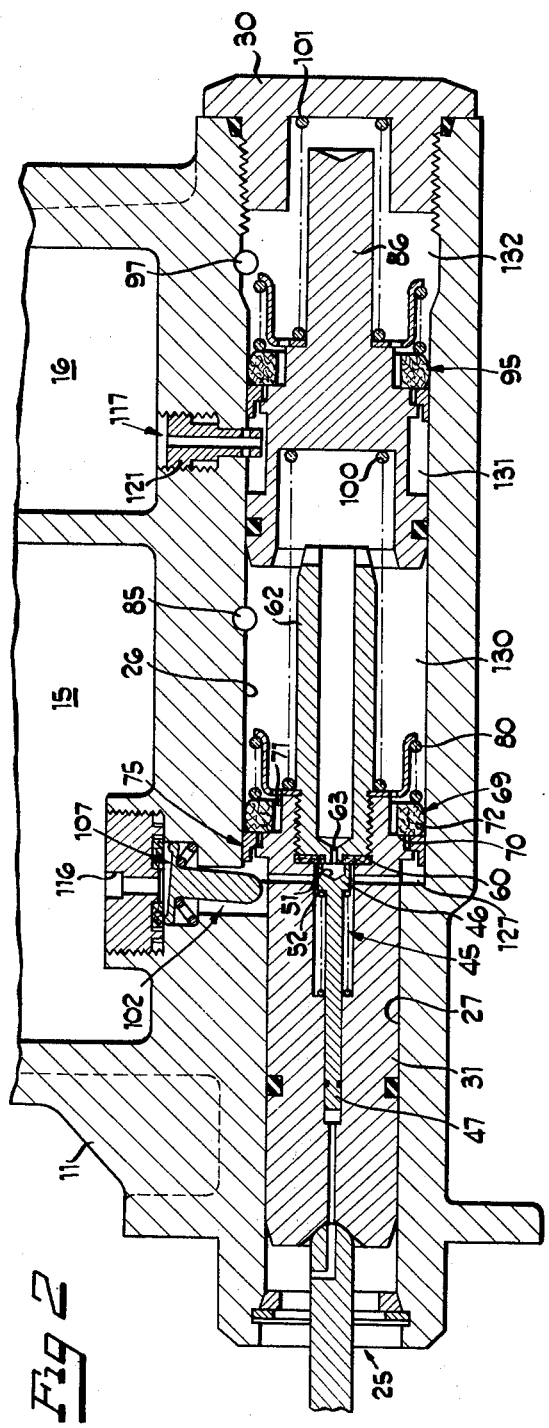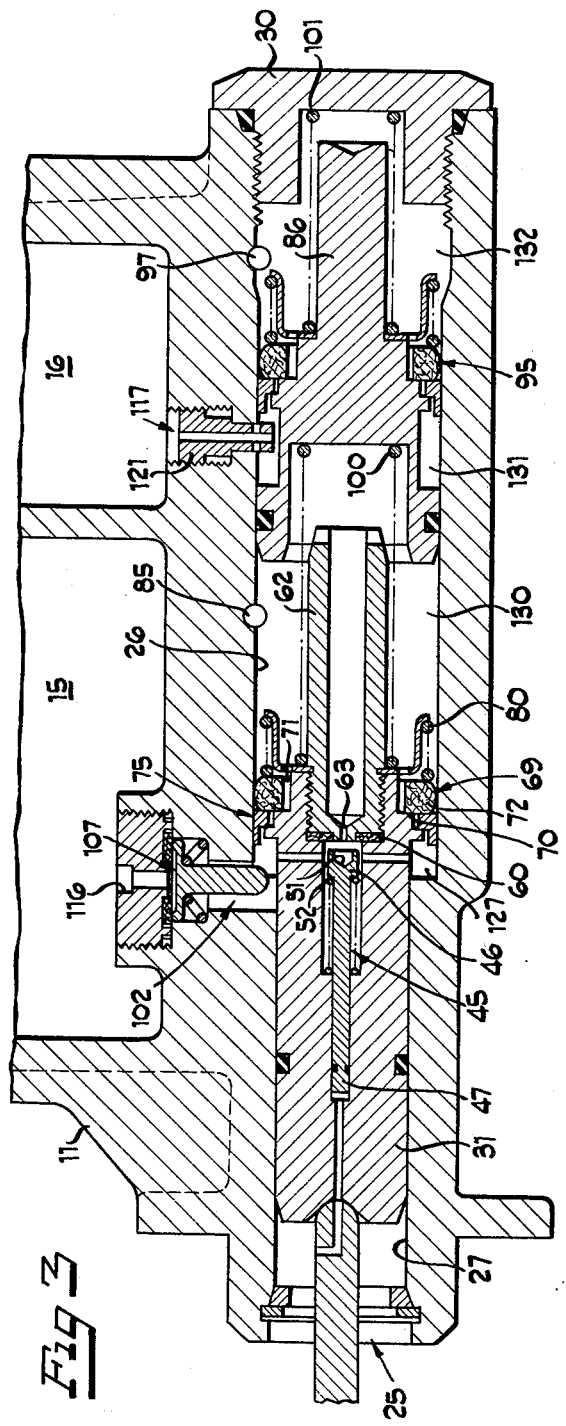

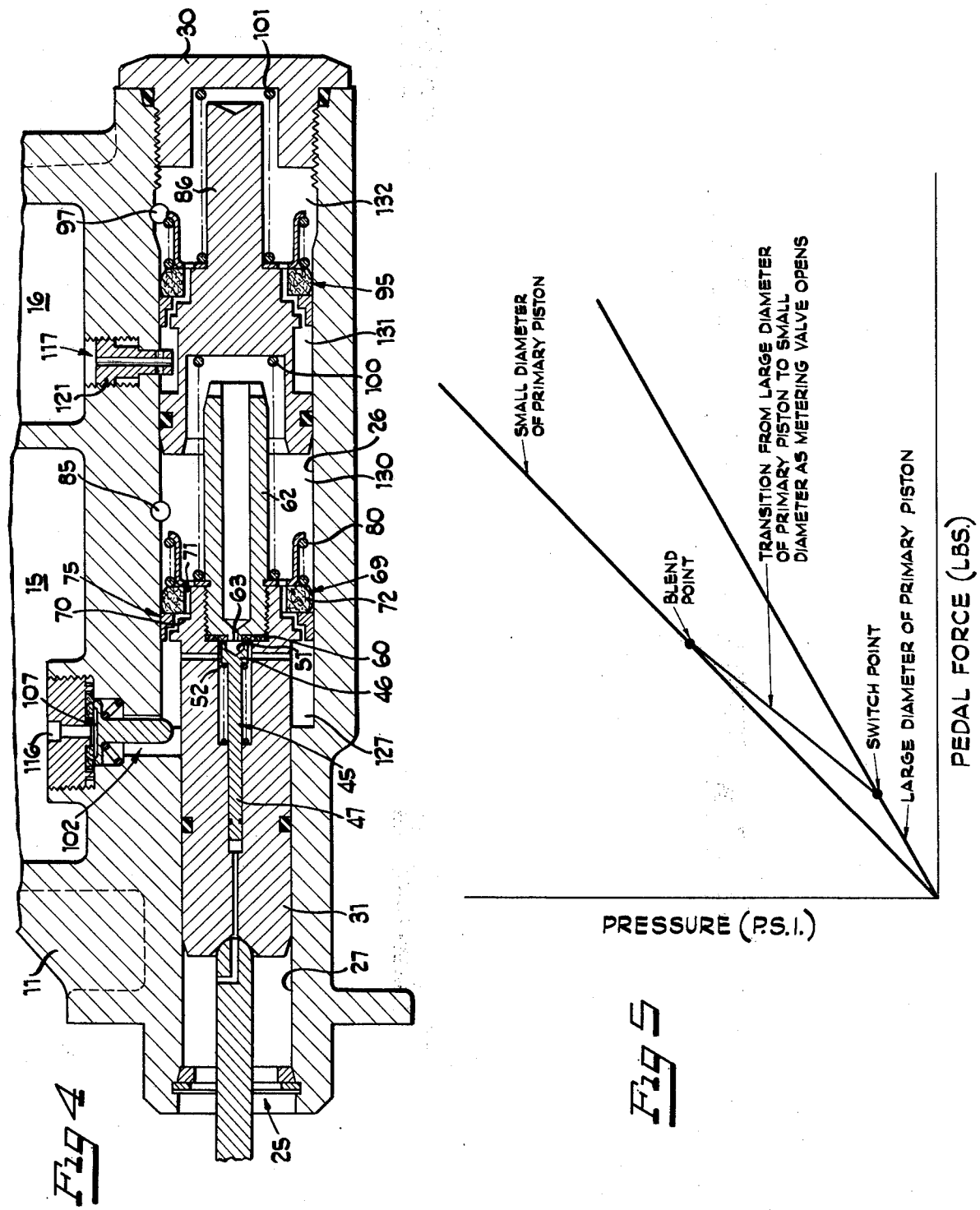

VARIABLE RATIO MASTER CYLINDER

BACKGROUND OF THE INVENTION

This invention relates to a master cylinder used to supply fluid pressure to a hydraulic system and, more particularly, it relates to a master cylinder adapted for use in an automative hydraulic brake system which provides a gradual transition from a low pressure, high volume stage of operation for taking up the slack in the brake system to a high pressure low volume movement for applying the brakes.

Dual ratio master cylinders have been known in the brake art for some time. The main purpose for such a device is to bridge the gap presently existing in the market between brake systems of the power assist type and manual braking systems with no assist. The aim of such systems is to provide a brake master cylinder that will require less pedal effort with the same foot travel as existing manual master cylinders and to require lower pedal effort to power assisted systems when the power assist is inoperative.

Certain inherent faults in prior art dual ratio master cylinders have prevented their widespread adoption by the automotive industry in spite of the need such a device would fill. These shortcomings include a sharp transition from one stage to another which can be detected at the brake pedal by the operator's foot, premature transition from one stage to another when brakes are improperly adjusted, the lack of a fail-safe switchback feature whereby the device could return from second stage application to first stage application if either the brake system or master cylinder developed a leak under pressure and premature actuation of the second stage due to a sudden application of the brake pedal.

Some approaches to solving individual phases of these problems have been successful but no device has been produced which has been acceptable to the Automotive Industry which overcomes all of the objections raised while accomplishing all of the advantages sought.

SUMMARY OF THE INVENTION

The present invention provides a variable ratio master cylinder with a gradual blend or transition from one stage to another which will not interfere with the controllability of the brake or affect the feel of the brake pedal, which will produce higher output pressure with less pedal effort than a standard master cylinder, which will begin transition from one stage to another as a function of line pressure only thereby negating any effects of brake adjustment, which incorporates a restricted orifice in the metering valve circuit to preclude premature transition to the second stage due to sudden pedal applications, which provides a sealing system between the primary piston and bore which becomes inoperative during the return stroke of the piston for rapid return to the released state, which provides for a mechanical safety switchback providing a return to first stage operation in the event of a pressure failure and which provides a one-way valve between the fluid reservoir and the bore, biased open in the piston retracted position, for easy bleeding of the system.

BRIEF DESCRIPTION OF THE DRAWINGS

FIG. 2 is a sectional view showing the master cylinder in the low pressure, high volume stage.

FIG. 3 is a sectional view showing the master cylinder in the high pressure, low volume stage.

FIG. 4 is a sectional view showing the master cylinder in the piston return phase, and FIG. 5 is a graph showing pedal force versus pressure for a standard brake application.

DESCRIPTION OF THE PREFERRED EMBODIMENTS

Figure 1:
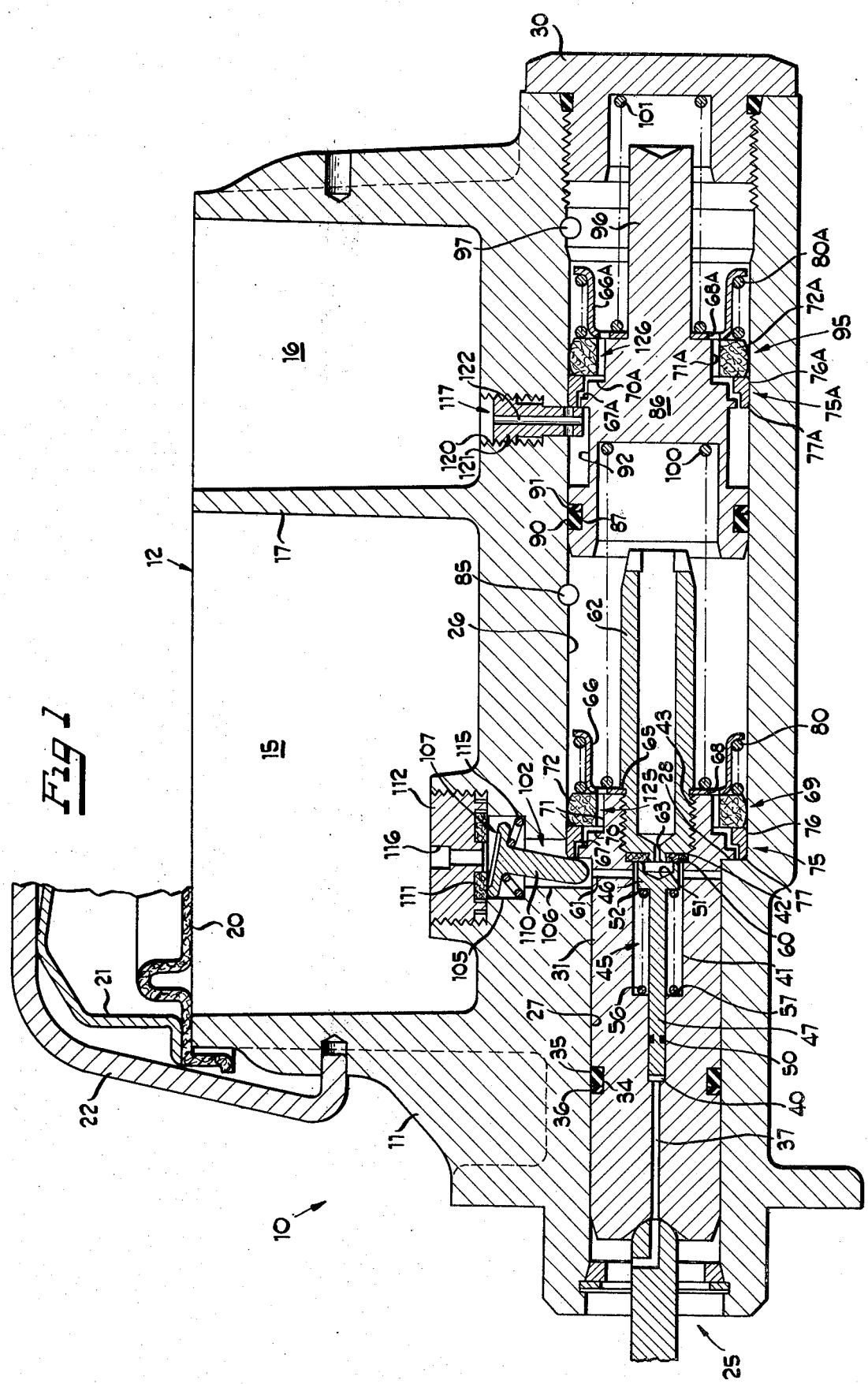
FIG. 1 is a sectional view showing one embodiment of the invention with the individual elements of the master cylinder in an "at rest" or retracted position prior to actuation.

As best illustrated in FIG. 1 a variable ratio master cylinder 10 is shown including a housing generally identified as 11. In line with current practice, the master cylinder is shown as a tandem or dual system with a pair of fluid outlets each of which is connected to one pair of wheel brakes. The tandem arrangement, however, is not required for the intended operation of the present invention. A fluid reservoir 12 is shown defined by the housing 11 and is divided into two separate wells 15 and 16 by the wall portion 17. Each of the two wells is designed to provide fluid for one line of the dual system. The fluid reservoir is sealed on top by a gasket 20, a cover 21 and a retention device 22 designed to snap in place exerting pressure on the reservoir cover and forcing the gasket against the housing thereby sealing the fluid reservoir against dirt or contamination.

The housing 11 further defines a stepped bore 25 including a large diameter portion 26 and a small diameter portion 27. A shoulder 28 is formed at the intersection of the bores. Secured to one end of the large diameter portion of the bore is a housing end cap 30 which functions as an end wall of the bore. A first piston 31 is shown disposed partially in the small diameter portion 27 and partially in the large diameter portion 26 of the bore 25. The first piston 31 includes an annular groove 34 defined on its periphery. Disposed within the groove 34 is an "O" ring 35 and an "O" ring back up 36 which cooperate to effect a seal between the first piston 31 and the inner wall of small diameter portion 27 of the bore and prevent the passage of any fluid therebetween.

The first piston 31 defines internally thereof five concentric bores 37, 40, 41, 42 and 43 of increasing diameter. The bore 37 is open to atmospheric pressure at its rearward end. Disposed within the bores 40 and 41 is a metering valve 45, which includes a head portion 46 and a stem portion 47. The stem portion 47 is slidably received within the bore 40 and a seal between the stem and the inner wall of the bore is provided by an O-ring 50. The head portion 46 includes a front face 51 and a rear face 52. The front face 51 has a pressure effectiveness area greater than the pressure effective area of the rear face 52. Disposed within the bore 41 is a spring 56 compressed between an end wall 57 and the rear face 52 of the metering valve urging the valve to the right as shown in FIG. 1. Disposed within the bore 42 is a metering valve seat 60 preferably formed of rubber or some other resilient material. A radially oriented fluid passage 61 is shown defined by the first piston 31 communicating with the bore 41.

Secured within the bore 43 is a mechanical safety means 62 shown as a piston extension. The extension 62 is secured within the bore 43 such that it abuts the metering valve seat 60 and holds it in place for engagement by the metering valve 45. The piston extension 62 includes a shoulder 65 which abuts a compensating seal spring retainer 66 and holds it in place against the end of the first piston 31. The piston extension 62 defines a restricted orifice 63 which commnuciates with the front face 51 of the valve 45. The spring retainer 66 defines a fluid port 68 therethrough.

The first piston 31 at its forward end and outer periphery defines a shoulder 67 and a shoulder 70. The piston 31 includes an annular portion of reduced diameter which, in combination with the spring retainer 66, defines a circumferential groove 71. A seal assembly 69 is provided to operate in association with the first piston 31. Disposed within the groove 71, between the spring retainer 66 and the shoulder 70 lies a compensating seal 72 made of resilient material comprising a ring having opposed radial faces, an inner circular periphery, and an outer circular periphery having an arcuate outline when viewed transversely of said faces. The apex of the arcuate portion of the seal 72 frictionally contacts the inner cylinder wall of the large diameter portion 26 of the bore and is floatingly received in the groove 71 and slidable in either direction between the shoulder 70 and the spring retainer 66. A conpensator ring 75 is shown having a block portion 76 disposed between the seal 72 and the shoulder 67 and a finger portion 77 extending from the block portion. Biasing means 80 here shown as a coiled spring is shown compressed between a flange of the compensating seal spring retainer 66 and the compensating seal 72 to urge the seal to the left as shown in FIG. 1.

A fluid outlet 85 is shown in communication with the large diameter portion 26 of the bore and is adapted to be connected to one of the dual pressure lines running from the master cylinder.

A second piston 86 is shown disposed within the large diameter portion 26 of the bore. The second piston 86 defines a groove 87 at its outer periphery. Disposed within the groove 87 are an O ring 90 and a O ring back up 91 which function as a seal between the piston 86 and the large diameter portion 26 of the bore and prevents the passage of any fluid therebetween. The piston 86 further defines another groove 92, the purpose for which will soon become apparent.

A seal assembly 95 is provided to operation in association with the second piston 86. This seal assembly is substantially identical to the seal assembly 96 for the first piston 31, and corresponding elements for the seal assembly 95 will be given the same identifing numerals as the elements of the seal assembly 69 with the addition of the suffix A thereto.

The piston 86 includes an axially extending projection 96. A fluid outlet 97 is shown in communication with the large diameter portion 26 of the bore and serves to transmit fluid pressure to one of the dual pressure lines of the brake assembly.

Biasing means 100 here shown as a coil spring, are disposed between the first piston 31 and the second piston 86. Additional biasing means 101 are shown disposed between the second piston 86 and the end cap 30 for urging the pistons to a normally retracted position.

A first fluid passage 102 is provided between the well 15 of the reservoir 12 and the large diameter portion 26 of the bore. The passage includes a channel 105 and a channel 106. A one-way tipping valve mechanism 107 is shown disposed in the fluid passage 102. The tipping valve mechanism 107 includes a tipping valve member 110, a tipping valve seat 111, a tipping valve seat carrier 112 which is secured to the housing and holds the valve seat in place and biasing means 115 here shown as a conical coil spring adapted to urge the tipping valve 110 against the valve seat 111. The valve seat carrier 112 includes a fluid passage 116 defined therethrough.

A second fluid passage 117 is shown defined between the well 16 and the large diameter portion 26 of the bore. The second fluid passage 117 includes a stepped bore 120 and a piston stop 121 screwed into the bore 120 defining an internal passage 122 therethrough. The lower portion of the piston stop 121 serves to limit the rearward travel of the second piston 86.

The operation of the embodiment shown in FIGS. 1 through 4 is as follows: FIG. 1, as previously explained, illustrates the relative position of the various elements of the master cylinder in their "at rest" or "retracted" or "brake unapplied" position. The first piston 31 is at its rearward position in the stepped bore 25 such that the shoulder 67 contacts the lower portion of the tipping valve member 110 urging it, against the force of the spring 115, to open, allowing communication between the well 15 and the large diameter portion 26 of the bore through fluid passage 102. The finger portion 77 of the compensator ring 75, by virtue of its engagement with the shoulder 28 holds the compensating seal 72, against the force of the spring 80, to the right as shown in FIG. 1 against or near the seal spring retainer 66. With the elements of the seal assembly in this position, a fluid passage 125 exists between the channel 106 and a fluid chamber to be described located in front of the compensating seal 72. Fluid is thus allowed to flow from the channel 106, between the compensator ring 75 and the piston 31, through the groove 71 and through fluid port 68 in the seal spring retainer 66. The metering valve 45 is biased to its closed position by the spring 56 and seats against the metering valve seat 60. At this point, only atmospheric pressure exists within the system. By virtue of the communication between the reservoir 12 and the stepped bore 25 bleeding of the system in the brake unapplied condition is facilitated for use with a pressure bleeder.

The piston 86 is urged to its rearmost position by the spring 101. The shoulder 67A abuts the piston stop 121. The compensator ring 75A, by virtue of its contact with the piston stop 121, opens a fluid passage 126 between the second fluid passage 117 and a fluid chamber to be described in front of the compensating seal 72A. The fluid passage 126 allows fluid to flow from the well 16, between the compensator ring 75A and the piston shoulder 70A, and then through groove 71A and port 68A in the compensating seal spring retainer 66A.

When energization of the hydraulic brake system is desired, force is applied to the brake pedal, not shown, which, through the brake linkage, transmits the force to a push rod which is carried in the recess at the left hand end of the first piston 31. The push rod forces the first piston 31 to the right as best shown in FIG. 2. The combination of the force of the spring 100 and the force generated by the pressure in chamber 130 acts against the piston 86 urging it to the right. After this initial movement of the pistons, the tipping valve member 110 is urged towards the closed position by the spring 115 but remains slightly open and allows communication of fluid through the fluid passage 102 preventing a vacuum from being created in chamber 127. The compensating seals 72 and 72A are acted on by the springs 80 and 80A and upon further movement of the pistons, assume the position shown in FIG. 2. One side of the seal abuts the shoulder 70 and the seal ring 75. The compensating rings 75 and 75A rest against the shoulders 67 and 67A of the first and second pistons respectively.

Thus, after initial movement of the piston 31, the compensating seal 72 divides the large diameter portion 26 of the stepped bore into a first chamber 127, defined rearwardly of the seal 72 and a second chamber 130 defined between the seal 72 and the second piston 86. The seal 72A further divides the large diameter portion 26 of the bore into a third chamber 131, defined rearwardly of the seal 72A and a fourth chamber 132, defined between the seal 72A and the end cap 30.

The metering valve in the phase of operation illustrated in FIG. 2 remains closed. As the piston 31 continues to move to the right, the pressure effective area of the piston 31 constitutes the area lying within the circle described by the outer periphery of the compensating seal 72. As the first piston 31 moves through its pressure stroke in the first stage, it moves relative to piston 86 displacing fluid from chamber 130 at a high volume, low pressure rate which fluid is supplied to the pressure line of the dual system which is associated with the fluid outlet 85, to take up the slack between either the brake shoes and drums in a drum brake system or the pads and the disc in a disc brake system. After the initial fluid displacement, the force exerted by the spring 100 and the pressure force in the chamber 130 forces movement of the second piston 86.

Consequently, pressure is generated in chamber 132 and is supplied through fluid outlet 97 to the other pressure line of the dual system. The pressure in chamber 132 is approximately equal to the pressure in chamber 130 during this stage of operation since the pressure effective area of the piston 86 is equal to the pressure effective area of the piston 31. The tipping valve mechanism 107 functions as a one-way valve and allows fluid to flow from the fluid reservoir 15 into the chamber 127 to fill the vacuum created behind the seal 72.

As the piston 31 continues to move to the right, all slack is taken up in the system and the fluid pressure in chambers 130 and 132 then begins to markedly increase. When the pressure in chamber 130 reaches a predetermined value (approximately 250 p.s.i. for purpose of example) the metering valve 45 begins to open. The metering valve 45 is set to open when the force exerted by the pressure in chamber 130 acting across the pressure effective front face 51 of the valve exceeds the force exerted by the spring 56. Before the valve begins to open the pressure in chamber 127 is approximately atmospheric. The point at which the metering valve begins to open is shown on the graph of FIG. 5 and is identified as the switch point. At this point, when the pressure in the chamber 127 exceeds atmospheric pressure, the tipping valve 107 will close. The metering valve 45 will remain open momentarily whereupon the pressure in chamber 127 will increase. The spring and the increased pressure in chamber 127 will close the metering valve. For continued movement of the piston 31 the pressure in chamber 130 again increases up to the point where the forces tending to open the metering valve exceed the forces tending to close the metering valve at which point the valve opens and, when the pressure in chamber 127 increases sufficiently, closes again. The spring 56 and the front and rear faces 51 and 52 of the metering valve are designed such that at approximately a pressure of 1,000 p.s.i. in chamber 130, the metering valve will remain open allowing the pressure in chambers 127 and 130 to equalize. This point is identified in FIG. 5 as the blend point. For any further increase in pressure in chamber 2, the metering valve will continue to remain open as shown in FIG. 3.

The operation of the metering valve 45 during the transition from the switch point to blend point is best explained as follows. The valve 45 is designed such that the fluid pressure opening area of the valve is greater than the fluid pressure closing area. The spring 56 is provided to assist in the closing movement, the relative areas and spring force being determined from certain equations depending upon the pressure values desired. The difference in areas is achieved by providing the metering valve 45 with the stem 47 slidable in the bore 40 which, through bore 37, is in communication with atmospheric pressure. With this construction, the fluid pressure opening area of the valve 45 is the area of the valve front face 51. The fluid pressure closing area is equal to the area of the valve rear face 52 which is also equal to the area of the front face 51 minus the area of the stem 47.

With this design, when the pressure on the pedal and the resistance to movement of the brakes causes the fluid pressure in chamber 130 to reach the predetermined opening value, the valve opening force on the metering valve 45 will overcome the valve closing force of the spring 56 and the valve will open, creating a fluid pressure in chamber 127 which will act to close the valve. Thereafter, for any definite amount of increased pressure on the pedal, there will be a definite, determinable pressure ratio between the fluid pressure valve opening force and the fluid pressure valve closing force at which the valve will again seat itself up to a certain stage of pedal pressure. After this certain stage of pressure has been reached, an increase in pedal pressure will increase the hydraulic forces acting but will not result in a closing of the valve.

The valve will begin its opening and closing action at the switch point when the fluid pressure on the valve is sufficient to overcome the valve closing force of the spring, but the valve will not remain constantly open until the pressure acting on front face 51 times the area of the stem 47 equals the installed force of the spring 56 at the blend point.

Once the blend point has been reached, the metering valve remains open allowing fluid pressures in chambers 127 and 130 to equalize and allowing fluid communication from chamber 130 to chamber 127 through the restricted orifice 63 for further movement of the piston 31. The effective area of the piston 31 is no longer equal to the area lying within the circumference of the compensating seal 72 but is now equal to the area of the piston 31 lying within the small diameter portion 27 of the stepped bore.

In the event that an attempt is made to apply the brakes rapidly, as in a "panic stop", the resulting rapid displacement of fluid in the first stage of operation can result in a pressure rise within the cylinder due to the restriction of fluid outlet ports 85 and 97. This pressure may easily exceed the pressure at which the metering valve 45 begins to function, and allows fluid to pass from chamber 130 to chamber 127 even though braking pressure at the wheels is momentarily at a very low level, and the slack has not been taken out of the brake system. To prevent premature transition from the first stage of operation to the second stage, the restricted orifice 63 is placed in the passage connecting chamber 130 with the front face 51 of the metering valve, the size of the orifice being suitably chosen according to the characteristics of the brake system, such that the orifice will momentarily restrict the flow of fluid threrethrough, and thus delay the transition from one stage to the next.

With the master cylinder now in the second stage of operation, as best shown in FIG. 3, pressure is applied at a low volume, high pressure rate. During the first stage, when the metering valve 45 is closed, the first and second pistons move relative to each other as a result of displacing fluid through outlet 85. When the switch point is reached, the first piston will move at a greater rate toward the second piston when the metering valve is open. After the blend point is reached, the first piston will move toward the second piston at a still greater rate upon application of additional pedal force due to the dfferent effective areas of each piston and the passage of fluid through outlet 85. As previously explained, the effective area of the first piston 31 is equal to the area of the small piston lying within the small diameter portion of the bore. The effective area of the second piston 86 is equal to the area described within the outer perimeter of the compensating seal 72A which effective area is larger than the effective area of the first piston 31. It therefore becomes apparent that to generate the same pressure in both lines of the dual braking system, the smaller piston 31 will have to traverse a greater distance than the large piston 86.

Upon application of excessive pedal effort, the capabilities of chambers 130 and 132 might be exceeded to the extent that piston 31 bottoms against piston 86 which bottoms against end cap 30.

The mechanical safety 62 is operative to allow the system to switch back to a high volume transfer of fluid in the event of a failure in the line fed by outlet 85. If such failure occurred, the metering valve 45 would close and the first piston 31 would immediately move toward the large piston 86 whereby the piston extension 62 would mechanically contact the second piston 86 thereby moving it at the same rate as the small piston 31 and applying high volume, low pressure to the functioning set of brakes. If the line fed by outlet 97 fails, piston 86 bottoms against end cap 30, the piston 31 initially displacing high volume then switching to boost with low volume, high pressure as if it were a single master cylinder.

Just prior to brake release, and when beyond the blend point, the pressures in chambers 127 and 130 are equal. When the force is released on the brake pedal and when the pressure in the system drops below the blend point 21, the metering valve 45 closes locking pressure in chamber 127. The pressure in chamber 130 and the force of spring 100 act against piston 31 to move it to the left as best shown in FIG. 4 to return it to its retracted position. The pressure imbalance between chambers 127 and 130 plus the friction force exerted on the seal 72 by virtue of its contact with the inner cylinder wall of the large diameter portion 26 retards movement of the seal while the piston 31 moves to the left enough to reestablish communication between chambers 130 and 127 through fluid passage 125. At the same time, the pressure in chamber 132 and the spring 101 act against piston 86 to move it to the left and return it to its retracted position. Since the chamber 131 is at atmospheric pressure the seal 72A will not open fluid passage 126 until the pressure in chamber 132 is low enough so that the friction force acting on the seal 72A is sufficient to retard movement of the seal against the force of spring 80A and allow the piston 86 to move to the left with respect to seal 72A until the seal moves off the sealing surface. Thus, fluid communication is reestablished between chambers 131 and 132 through fluid passage 126.

Such a sealing arrangement provides for rapid return of the pistons to their retracted position and prevents suction being set up in the chambers 130 and 132 which might hinder return of the pistons to their retracted positions. When the pistons fully return to their retracted positions, the elements will again resume the positions shown in FIG. 1 with the tipping valve mechanism 107 again being opened by the piston 31 and the compensator rings 75 and 75A opening the fluid passages 102 and 125 and 126 for compensation.

Thus, it has been shown that a variable ratio master cylinder has been provided which effects a gradual transition from one stage to another, which produces a higher output pressure with less pedal effort than a standard master cylinder, which begins transition from one stage to another as a function of line pressure only, which prevents premature transition to the second stage as a result of a sudden pedal application, which provides for rapid return of the pistons to a retracted position, which incorporates a mechanical safety switch back and facilitates easy pressure bleeding of the system.

Various of the features of the invention have been particularly shown and described, however, it should be obvious to one skilled in the art that various modifications may be made therein without departing from the scope of the invention.

What is claimed is:

1. A variable ratio master cylinder including a housing defining a fluid reservoir; a stepped bore defined by said housing including a large diameter portion and a small diameter portion, said large diameter portion having an end wall; a piston operable within said small diameter bore and said large diameter bore; a seal associated with said piston and reciprocable relative thereto and adapted in one position to divide said large diameter bore into a first chamber defined rearwardly of said seal and a second chamber defined between said seal and said end wall; a differential area metering valve carried by said piston and disposed between said first and second chambers adapted to meter fluid from said second chamber to said first chamber when a predetermined pressure differential exists between said first and second chambers, said metering valve including a head portion and a rearwardly extending valve stem terminating in an end directly exposed to atmospheric pressure, said valve head portion having a valve opening area exposed to the pressure in said second chamber, a valve closing area, smaller than said valve opening area due to the valve stem extending therefrom, exposed to the pressure in said first chamber and biasing means urging said valve to a closed position and a fluid outlet in communication with said second chamber; said metering valve opening and closing in a sequence of operations as the pressure increases in said second chamber due to movement of said piston from an initial predetermined pressure differential until a higher predetermined pressure differential is reached where upon the valve remains open throughout the remainder of the piston movement.

2. A variable ratio master cylinder as in claim 1 in which said piston includes a restricted orifice communicating between said second chamber and said valve opening area.

3. A variable ratio master cylinder as in claim 1 including a fluid passage defined between said reservoir and said first chamber, and tipping valve means disposed in said fluid passage such that said tipping valve means is opened by said piston and is held open when said piston assumes a retracted position.

4. A variable ratio master cylinder as in claim 1 in which said piston includes a circumferential groove including axially spaced shoulders defining the width thereof, said seal includes a freely mounted resilient sealing ring within said groove, a second fluid passage between said first and second chambers defined between said sealing ring and said groove, and biasing means associated with said seal to urge said sealing ring to a closed position, said seal operative such that said sealing ring is closed and prevents communication through said second fluid passage during the pressure stroke of said piston but allows communication through said second passage during the return stroke of said piston.

5. A variable ratio master cylinder as in claim 4 including a compensator ring having an L-shape in cross section associated with said piston and said seal member such that said compensator ring acts upon said sealing ring to overcome the force of said biasing means and allow communication through said second fluid passage between said first and second chambers when said piston assumes its retracted position.

6. A variable ratio master cylinder as in claim 1 including a compression spring located within said second chamber between said piston and said end wall urging said piston to its retracted position.

7. A variable ratio master cylinder including a housing defining a fluid reservoir; a stepped bore defined by said housing including a large diameter portion and a small diameter portion, said large diameter portion having an end wall; a first piston operable within said small diameter bore and said large diameter bore; a second piston operable in said large diameter bore; a first seal associated with said first piston and reciprocable relative thereto and adapted in one position to divide said large diameter bore into a first chamber defined rearwardly of said first seal and a second chamber defined between said first seal and said second piston; a second seal associated with said second piston and reciprocable relative thereto and further dividing said large diameter bore into a third chamber defined rearwardly of said second seal and a fourth chamber defined between said second seal and said bore end wall; a differential area metering valve carried by said first piston and disposed between said first and second chambers adapted to meter fluid from said second chamber to said first chamber when a predetermined pressure differential exists between said first and second chambers, said metering valve including a head portion and a rearwardly extending valve stem terminating in an end directly exposed to atmospheric pressure, said valve head portion having a valve opening area exposed to the pressure in said second chamber, a valve closing area, smaller than said valve opening area due to the valve stem extending therefrom exposed to the pressure in said first chamber and biasing means urging said valve to a closed position; a first fluid outlet in communication with said second chamber; and a second fluid outlet in communication with said fourth chamber; said metering valve opening and closing in a sequence of operations as the pressure increases in said second chamber due to movement of said first piston from an initial predetermined pressure differential until a higher predetermined pressure differential is reached whereupon the valve remains open throughout the remainder of the piston movement.

8. A variable ratio master cylinder as in claim 7 including a first fluid passage defined between said fluid reservoir and said first chamber; a second fluid passage defined between said reservoir and said third chamber; and tipping valve means located in said first fluid passage such that said tipping valve means is opened by said first piston and held open when said first piston assumes a retracted position.

9. A variable ratio master cylinder as in claim 7 in which said first piston includes a circumferential groove including axially spaced shoulders defining the width thereof, said first seal including a freely mounted resilient sealing ring within said groove, a fluid passage between said first and second chambers defined between said sealing ring and said groove, and biasing means associated with said first seal to urge said sealing ring to a closed position, said seal operative such that said sealing ring is in closed position and prevents communication through said last mentioned fluid passage during the pressure stroke of said piston but allows communication through said passage during the return stroke of said piston.

10. A variable ratio master cylinder as in claim 9 in which said second piston includes a circumferential groove including axial spaced shoulders defining the width thereof and in which said second seal includes a freely mounted resilient sealing ring within said groove, a fluid passage between said third and fourth chambers defined between said sealing ring and said groove, and biasing means associated with said second seal to urge said sealing ring to a closed position, said second seal operative such that said sealing ring is in closed position and prevents communication through said last mentioned fluid passage during the pressure stroke of said second piston but allows communication through said passage during a portion of the return stroke of said piston.

11. A variable ratio master cylinder as in claim 10 including a compensator ring having an L-shape in cross section associated with each of said first piston and said first seal member and said second piston and said second seal member such that each of said compensator rings acts upon its associated sealing ring to overcome the force of said biasing means and allow communication through said associated fluid passage between said connected chambers when said associated piston assumes its retracted position.

12. A variable ratio master cylinder as in claim 7 including first biasing means disposed between said end wall and said second piston urging said second piston to its retracted position, and second separate biasing means disposed between said first and second pistons urging said first piston to its retracted position.

13. A variable ratio master cylinder as in claim 7 including mechanical safety means disposed between said first and second pistons such that upon a predetermined relative movement of said first piston toward said second piston a mechanical connection is established between said pistons preventing further relative movement of said first piston towards said second piston.

14. A variable ratio master cylinder as in claim 13 in which said mechanical safety means comprises a piston extension attached to and extending from said first piston.

15. A variable ratio master cylinder as in claim 7 in which said first piston includes a restricted orifice communicating between said second chamber and said valve opening area.

* * * * *